United States Patent
Du et al.

(10) Patent No.: US 6,892,170 B1
(45) Date of Patent: May 10, 2005

(54) METHOD AND APPARATUS FOR MODELING MASS STORAGE DISK DRIVE MOTORS

(75) Inventors: Tan Du, Plano, TX (US); Robert E. Whyte, Jr., Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1017 days.

(21) Appl. No.: 09/626,622

(22) Filed: Jul. 27, 2000

(51) Int. Cl.[7] .............................................. G06G 7/62
(52) U.S. Cl. ...................................... 703/13; 318/797
(58) Field of Search ..................... 703/13, 18; 318/797, 318/798, 254, 701, 439

(56) References Cited

U.S. PATENT DOCUMENTS

| | | | |
|---|---|---|---|
| 4,258,302 A | * | 3/1981 | Plunkett ..................... 318/723 |
| 4,772,839 A | | 9/1988 | MacMinn et al. |
| 5,028,852 A | | 7/1991 | Dunfield |
| 5,057,753 A | | 10/1991 | Leuthold et al. |
| 5,191,270 A | | 3/1993 | McCormack |
| 5,327,053 A | | 7/1994 | Mann et al. |
| 5,382,889 A | | 1/1995 | Peters et al. |
| 5,384,527 A | | 1/1995 | Rozman et al. |
| 5,387,854 A | * | 2/1995 | McCleer et al. ............ 318/719 |
| 5,530,326 A | | 6/1996 | Galvin et al. |
| 5,600,218 A | | 2/1997 | Holling et al. |
| 5,717,298 A | * | 2/1998 | Tang et al. ................. 318/254 |
| 5,825,113 A | * | 10/1998 | Lipo et al. .................. 310/181 |
| 5,990,643 A | | 11/1999 | Holling et al. |
| 6,107,774 A | * | 8/2000 | Yamada et al. ............ 318/807 |

* cited by examiner

*Primary Examiner*—Albert W. Paladini
(74) *Attorney, Agent, or Firm*—W. Daniel Swayze, Jr.; W. James Brady; Frederick J. Telecky, Jr.

(57) ABSTRACT

The present invention provides an improved model and methodology for simulating motor performance which allow increased control accuracy at the higher currents, higher speeds, and/or higher current change rates required in modem mass storage devices. In addition, the invention provides methods for simulating motor performance, and for testing a motor commutation scheme. The model includes a plurality of phases extending between first ends joined at a center tap and second ends extending outward from the center tap to a corresponding plurality of phase taps, and a mutual inductance component disposed between two of the phases, wherein the mutual inductance and/or the phase inductance components may be a function of rotor position and/or current.

31 Claims, 14 Drawing Sheets

METHOD AND APPARATUS FOR MODELING MASS STORAGE DISK DRIVE MOTORS

TECHNICAL FIELD

This invention relates generally to the field of electric motor driving systems, and more particularly to a method and apparatus for modeling mass storage disk drive motors.

BACKGROUND OF THE INVENTION

Electric motors include a rotor and a stator having a plurality of wound field coils. Brushless DC motors are electronically commutated, wherein solid-state switching replaces the brushes and segmented commutators of traditional permanent magnet DC motors. Brushless motors may be of the variable reluctance, permanent magnet, or hybrid type. Variable reluctance brushless motors are characterized by having an iron core rotor follow or chase sequentially shifting magnetic fields of the stator coils to facilitate rotational motion of the rotor. Permanent magnet brushless motors are characterized by having the sequentially energized field coils attract or repel a permanent magnet rotor into rotational motion.

Electric motors are used to rotate loads in a variety of applications. One such application is in mass storage devices, such as hard disk drives. A hard disk drive generally includes a stack of rotating disks or platters and a spindle motor, which may be a salient pole brushless DC motor, for rotating the disks. The drive also includes one or more electromagnetic read/write heads which fly above the surface of the disks, an actuator motor (also known as a voice coil motor or VCM) which controls the positioning of the read/write heads, power circuitry to provide electrical power to the spindle and voice coil motors, circuitry for processing the data read from and/or written to the drive, and control circuitry to control the operation of the spindle and voice coil motors. The platters are typically rotated at a generally constant angular speed while the read/write heads read from or write to circular tracks on the platters. The mass storage device spindle motors are commonly multiple phase motors including a permanent magnet rotor and three electrical windings. The three electrical windings are related to the three phases of the motor. Three phase currents flow through the motor windings, typically at a 120 electrical degree phase relationship with respect to one another. The phase currents create a rotating electric field which causes angular rotation of the permanent magnet rotor.

The electromagnetic read/write heads read data from a disk platter by sensing flux changes on the magnetic surface of the platter as it passes beneath the read/write head. In order to synchronize the data being read from the disk with the operation of the data processing circuitry, it is necessary to carefully control the rotational speed of the disks. This is accomplished by controlling the current delivered to the spindle motor phase windings. The phase currents may be generated by the control circuitry in a variety of fashions. One method is to provide pulse-width-modulated (PWM) signals to the motor windings, wherein the timing of the individual PWM signals provided to each motor phase is determined by a control circuit. The duty cycle of the pulse width modulation signal therefore determines the average current delivered to the spindle motor. Another mode of current control is known as linear current control. The spindle motor control circuitry adjusts the level of current delivered by the power circuitry according to a desired motor performance parameter, such as speed and/or position.

Power is delivered to the motor phases through selectively energizing and de-energizing the individual phase windings. This process is known as commutation, and is accomplished via the control circuit. In order to rotate the disk drive motor in a given direction from startup and to maintain a desired rotational speed and torque at steady state, a commutation sequence or scheme is employed according to the present rotor position. This ensures that the proper phase windings are energized at appropriate times and polarities in order to provide the mutual attraction and/or repulsion between the phase windings and the rotor magnetic poles which results in the desired angular rotor motion.

To ensure proper rotational movement, it is essential to determine the position of the rotor with respect to the de-energized, or deactive, stator windings (or with respect to the energized windings). By knowing this position (sometimes referred to as commutation position), the stator windings can be energized in the appropriate sequence to create a revolving magnetic field in the motor to exert the desired rotational torque on the rotor. Rotor position has previously been detected by employing one or more transducers within the motor to sense the position of the rotor relative to the active stator windings.

However, the use of such transducers to determine commutation position has several drawbacks. First, these sensors increase production costs due to the need for sophisticated positional adjustment and increased wiring. Moreover, the space required for commutation position sensors is also a significant disadvantage in that valuable space is consumed within the motor housing. With an ever-increasing premium on space and cost efficiency, several attempts have been made to create sensorless commutation position feedback systems to replace the need for commutation position sensors within such motors.

The commutation control circuit is provided with rotor position information feedback (as well as rotor speed information), which is used to generate appropriate commutation signals for the motor windings. This position information may be obtained from some form of position sensor, or from measurements of back electromotive force (emf). Rotational position sensors include hall effect devices, magnetic sensors, optically encoded disks, resolvers, and other devices providing an indication of the relative positions of the rotor and stator to the control circuit via separate sensor signals. These devices, however, add to the cost and complexity of a motor, as well as occupying valuable physical space. Rotor position has also been heretofore determined or estimated based on a periodic measurement of back emf.

Conventional disk drive motors are commonly operated at approximately 5,200 rpm. However, the continuing trend in mass storage devices is toward higher data densities and faster data read and write access. As the data density (sometimes expressed in tracks per inch or TPI) increases in such devices, and as access times are reduced, higher motor speeds and improved speed control accuracy are desirable. For example, mass storage disk drive motor speeds of 7,200 rpm have been introduced. Although conventional speed and position control methods are adequate for lower speeds and data densities, improvements are desirable in order to achieve higher rotational speeds as well as improved control accuracy for disk drive motors, without adding cost to the mass storage device. Accordingly, improved methods and systems for simulating and modeling motor performance as well as for measuring rotor position are desirable to enable increased motor speed as well as improved motor control accuracy in high speed and/or high current applications.

SUMMARY OF THE INVENTION

The present invention provides an improved model and methodology for simulating motor performance which allows increased control accuracy at the high current, high speed, and/or high current change rates and data densities required in modem mass storage devices. In order to increase the storage capacity of hard disk drive devices, the number of platters may be increased, which requires higher startup current capability. In addition, motors designed for higher current operation typically have decreased phase resistances, resulting in increased phase inductance. Storage capacity may also be increased by increasing the data density or TPI of the platters. Corresponding improvement in spindle motor speed control accuracy is needed to accommodate the increased data density. Whereas prior motor modeling and simulation was sufficient for disk drive spindle motors operating at current speeds and data densities, the invention provides improved accuracy to enable high current, high speed, and/or high current change rate operation in association with higher data density drives. The invention provides a model for an electric motor which allows motor behavior or performance to be accurately analyzed, and a load circuit for simulating motor performance. In addition, the invention provides methods for simulating motor performance, and for testing a motor commutation scheme.

According to one aspect of the present invention, there is provided a model for simulating the performance of a polyphase electric motor. The model includes a plurality of phases extending between first ends joined at a center tap and second ends extending outward from the center tap to a corresponding plurality of phase taps, and a mutual inductance component disposed between two of the phases. The model may be used to simulate the performance of a motor, and finds particular utility in high current, high speed, and/or high current change rate motor control applications. The mutual inductance component may be a function of rotor position, thereby providing for improved control accuracy. In addition, at least one phase of the motor model may comprise a phase resistance component, a back emf component, and a phase inductance component, where the phase inductance component and/or the back emf component may also be a function of rotor position.

According to another aspect of the invention, the motor performance simulation model may include three phases joined by a center tap and three mutual inductance components disposed between the first and second, the second and third, and the third and first phases, respectively. Whereas prior models failed to provide accurate simulation of motor performance at high current, high speeds, and/or high current change rates, the present invention includes mutual inductance components which enable accurate simulation under such conditions. The model further contemplates the mutual inductance components being a function of motor rotor position. The individual phases in the model may include a phase resistance component, a back emf component, and a phase inductance component connected in series between the center tap and the individual phase tap. The phase inductance components, moreover, may include a phase inductance element which is a function of rotor position connected in parallel with a series combination of a leakage inductance element and an eddy current resistance element. The model thus accounts for positional variations in the motor electrical and rotational performance not previously considered in conventional motor models and simulations.

According to yet another aspect of the invention, there is provided a method of simulating the performance of a motor which facilitates development of high accuracy commutation control circuits and schemes for controlling high speed disk drive spindle motors for use in high density storage devices. The method employs a motor model having plurality of phases extending between first ends joined at a center tap and second ends extending outward from the center tap to a corresponding plurality of phase taps, and a mutual inductance component disposed between two of the phases. The method further includes applying an input signal to at least one of the phase taps, simulating the performance of a motor using the model and the input signal, and observing the performance of the model.

According to another aspect of the invention, the method may employ a three phase motor model having three phases and a center tap, with phase to phase mutual inductance components disposed there between, wherein input signals are applied to at least one of the phase taps. The performance of the motor is then simulated using the model and the input signals, and the motor performance is then observed. The motor model may include one or more components or elements which are a function of rotor position, allowing for improved motor position and speed control simulation, particularly at high rotor speeds. In this regard, the mutual inductance components may be a function of rotor position. The application of input signals to the phase taps may comprise providing commutation signals according to a commutation scheme, and observing the performance of the model may include determining the rotor position as a function of time.

According to still another aspect of the invention, a load circuit is provided for simulating the performance of an electric motor. The circuit includes first, second, and third phases extending between first ends joined at a center tap and second ends extending outward from the center tap to first, second, and third phase taps, respectively. In addition, the circuit has first, second, and third mutual inductance components disposed between the first and second, the second and third, and the third and first phases, respectively. The mutual inductance components may be a function of rotor position to more accurately account for actual motor performance characteristics at high current, high speeds, and/or high current change rates.

According to yet another aspect of the present invention, a method of testing a commutation scheme for controlling the position of an electric motor is provided. The method includes providing a model of the motor having three phases and a center tap, and mutual inductance components disposed between the first and second, the second and third, and the third and first phases, respectively, and selectively applying input signals to the phases according to the commutation scheme. The method further includes simulating the performance of a motor using the model and the input signals, and observing the performance of the model. The observance of the motor model performance may include, for example, determining the rotor position as a function of time, whereby the selective application of input signals may be performed according to the rotor position.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts. The invention is directed to a model for an electric motor finding particular application in simulating the performance of a high speed mass storage device spindle motor. The model includes components heretofore not found in conventional motor models which provide for improved simulation accuracy in high speed motor applications such as hard disk drive spindle motors. In particular, the invention includes one or more mutual inductance components in a polyphase motor model which may be a function of rotor position. The invention further includes a load circuit and methods for simulating motor performance and for testing a motor commutation scheme. While the various aspects of the invention are illustrated hereinafter with respect to certain motor winding configurations, it will be appreciated that the invention finds applications in association with other motor configurations, for example, delta wound motors, and the like.

Figure 1:
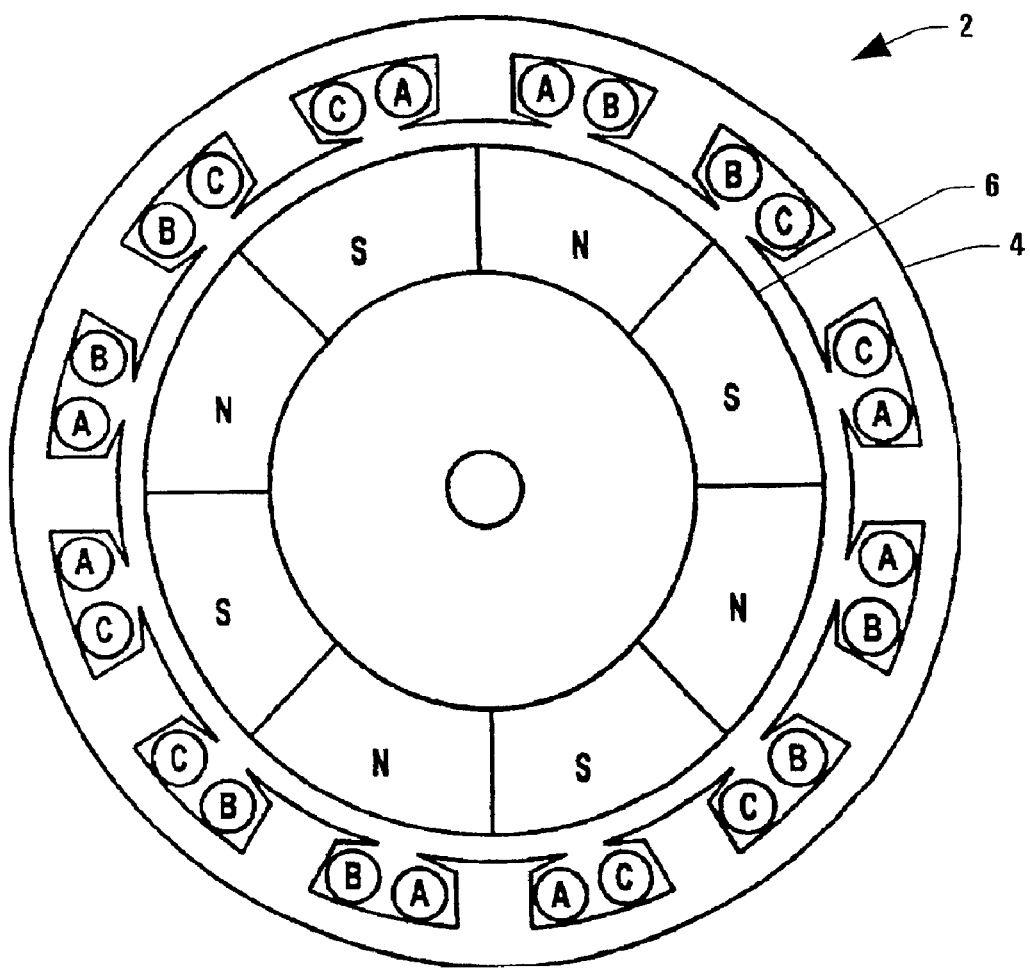
FIG. 1 is a sectional end elevation view of a polyphase electric motor having a permanent magnet rotor in which the principles of the present invention may be applied.

Referring now to FIG. 1, a typical polyphase motor 2 is illustrated having a stator 4 with a plurality of phase windings variously designated A, B, and C, which may be energized using corresponding phase taps (not shown) according to a commutation scheme. The commutation scheme may advantageously provide for appropriate windings A, B, and/or C to be energized at appropriate polarities such that mutual attraction and repulsion is provided between the resulting magnetic field and the permanent magnets of a rotor 6, having poles designated respectively as N and S. In this fashion, the rotor 6 may be made to rotate in a given angular direction in order to drive a load, such as a mass storage device platter.

Figure 2:
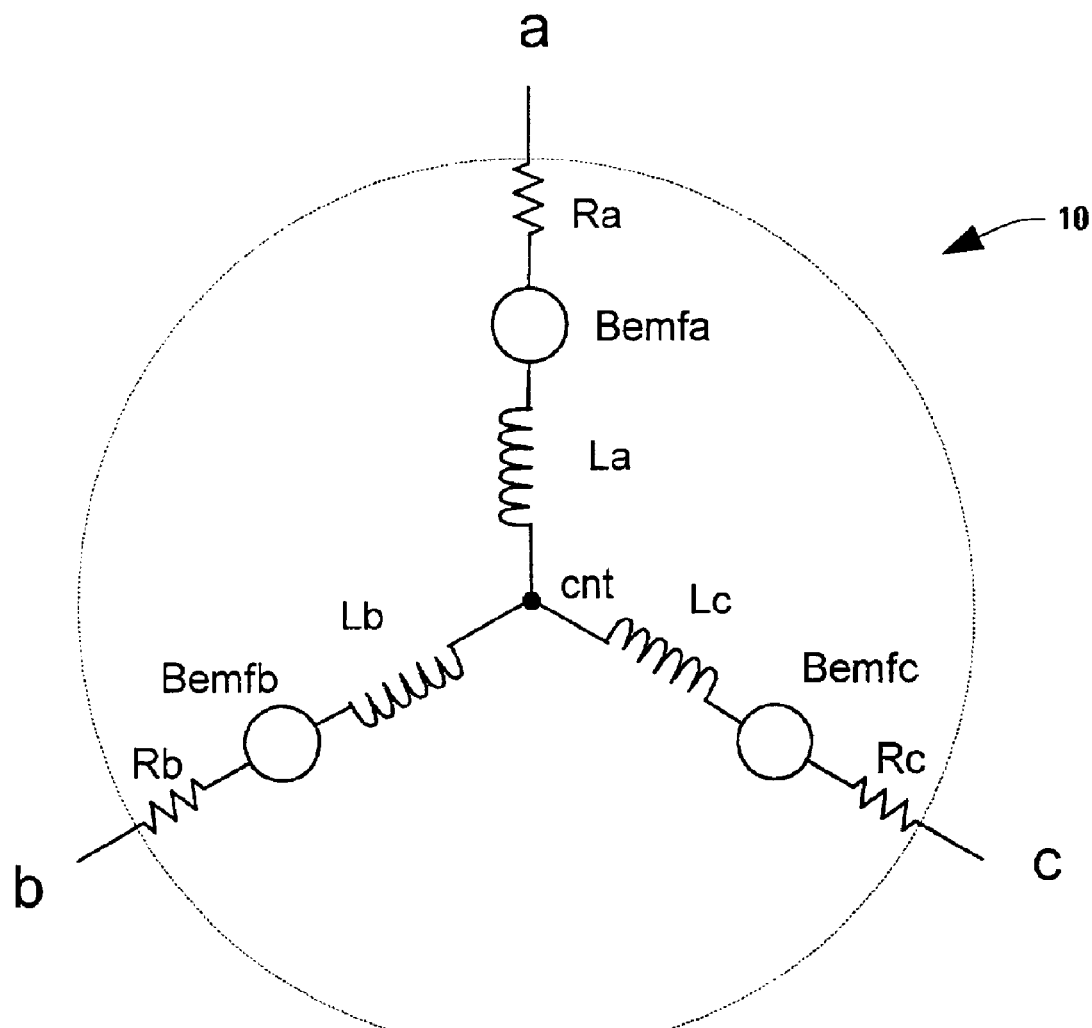
FIG. 2 is a schematic diagram illustrating a conventional three phase motor model.

FIG. 2 schematically illustrates a conventional three phase motor model 10 including phases a, b, and c having a resistance component, a back emf component, and a phase induction component, as well as a center tap cnt connecting the phases a, b, and c. For example, phase a includes a phase resistance Ra, a back electromotive force (emf) component Bemfa, and a phase inductance component La serially connected between phase tap a and the center tap cnt. In the past, the phase resistance components Ra, Rb, and Rc, as well as the phase inductance components La, Lb, and Lc have been assumed to be constant. In addition, it was previously assumed that the back emf components Bemfa, Bemfb, and Bemfc were a function of rotor speed only.

Although the model 10 roughly represents the characteristics of mass storage device spindle motors at lower current or speed when used with lower track density platters, the trend in such disk drive applications toward increased data density and correspondingly higher accuracy speed regulation has shown the conventional model 10 to be unsatisfactory. For example, the model 10 has proven inaccurate in predicting or simulating motor behavior when the phase windings are energized using pulse width modulation signals. In low speed, high current, and/or high current change rate control applications, several discrepancies have been found by the inventors of the present invention between the model 10 and actual motor performance. These discrepancies render the model 10 inoperative to verify control circuits and commutation schemes where high accuracy control is required, particularly at the high currents and high current change rates demanded by the mass storage device industry.

Figure 3A:
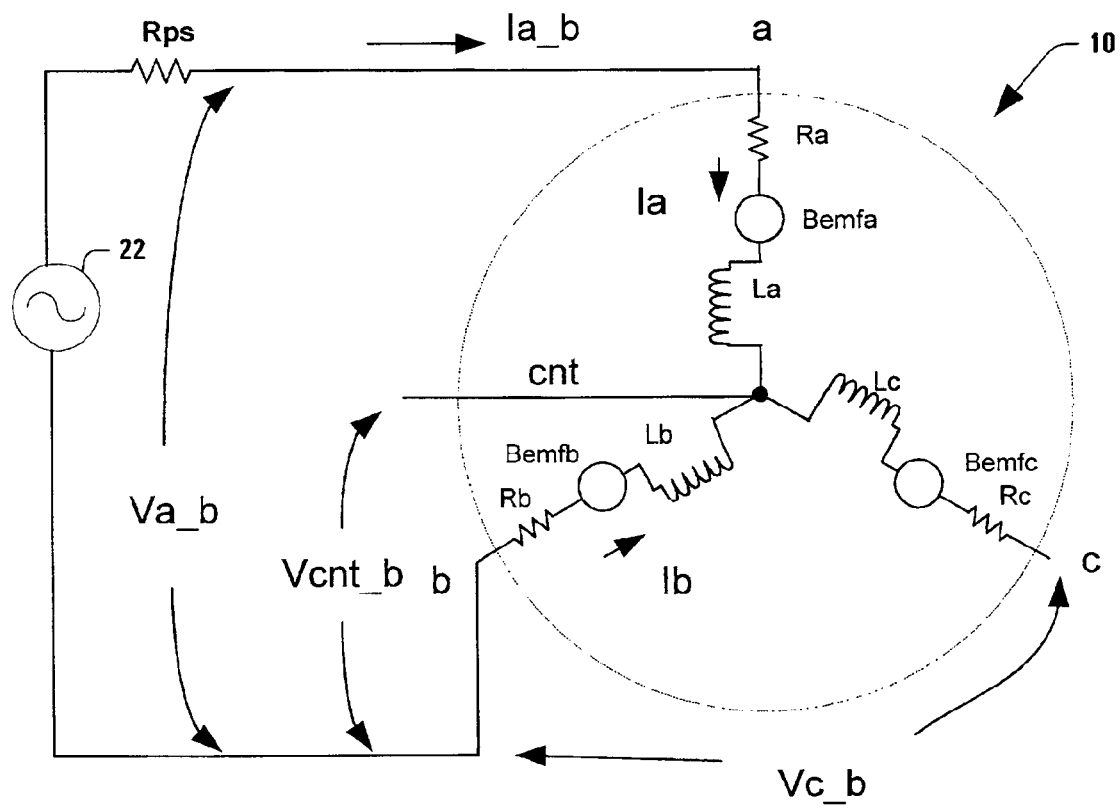
FIG. 3A is a schematic diagram illustrating a circuit for measuring the performance of a polyphase electric motor.

Referring now to FIG. 3A, a circuit 20 is illustrated for measuring the performance of or otherwise characterizing a polyphase electric motor. The circuit 20 includes a power source 22 with an output resistance Rps adapted to apply electrical power to two phases of an electric motor. In order to illustrate the shortcomings of the motor model 10 of FIG. 2, the power source 22 is connected to provide a voltage Va_b across phases a and b of motor model 10 while phase c is floated and the rotor is held stationary. The application of voltage Va_b causes current Ia_b (e.g., =Ia=−Ib, as illustrated in FIG. 3A) to flow. Because the rotor is not moving, the back emf component Bemfc of the floating phase is zero. Thus, according to the conventional model 10 of FIG. 2, the center tap voltage should be equal to one half of the applied phase to phase voltage Va_b, and the voltage between the center tap cnt and the floating phase tap c should be zero. However, the inventors of the present invention have found that this is not the case, as illustrated and described in greater detail hereinafter.

Figure 3B:
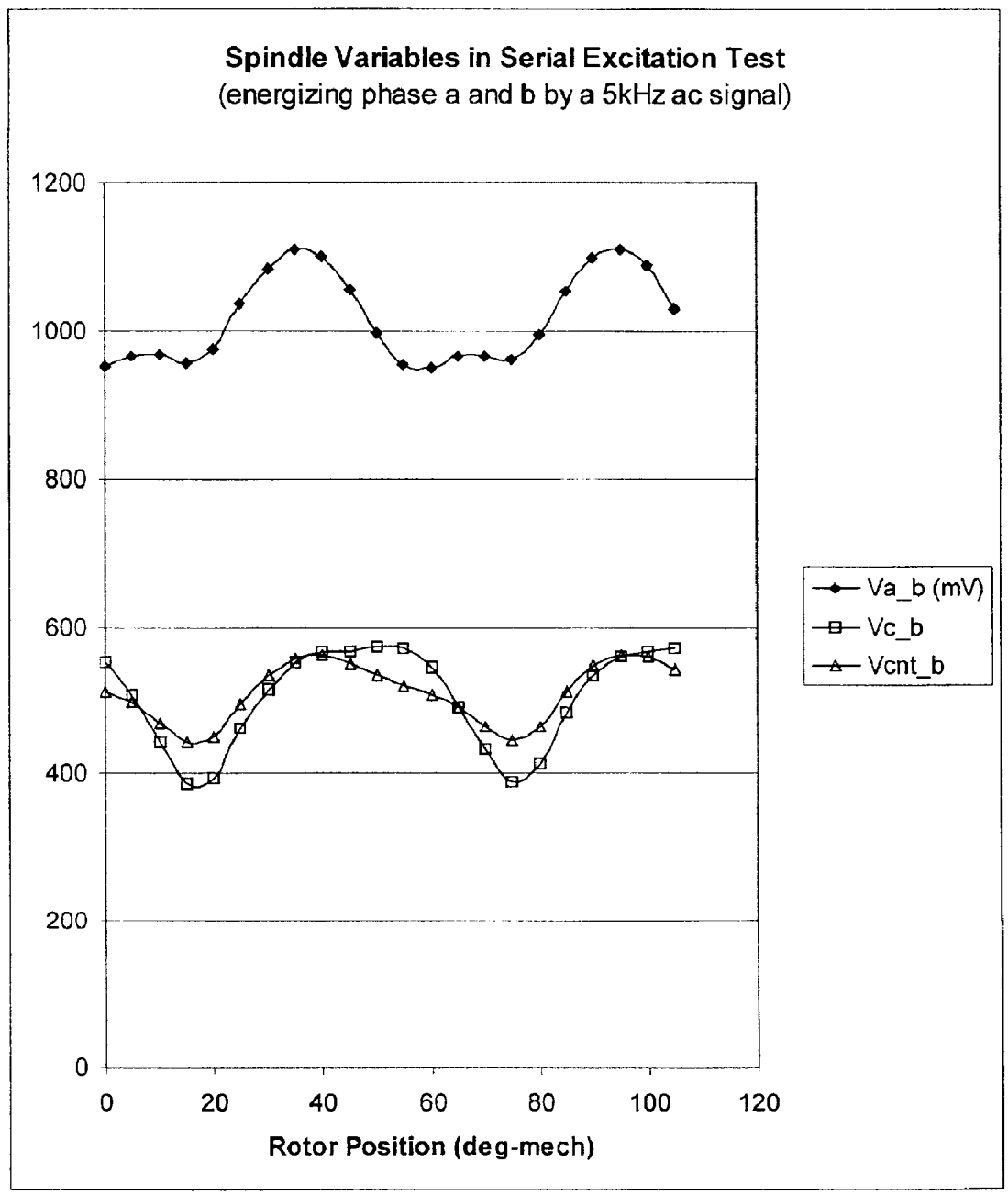
FIG. 3B is a graphical diagram illustrating three motor performance variables measured according to the circuit of FIG. 3A.

Referring also to FIG. 3B, a graph 30 illustrates the measured performance of a three phase spindle motor connected to the circuit 20 of FIG. 3A with respect to rotor position, wherein a 5 kHz current Ia_b has been applied to phases a and b while phase c is floated. It is noted from the graph 30 that the center tap voltage Vcnt_b is not one half of the phase voltage Va_b, but is instead variable with respect to the rotor position. In addition, the voltage between the center tap cnt and the floating phase tap c is not equal to zero, as would be expected from the conventional model 10. In particular, the model 10 leads one to expect that the voltage Vc_b between the floating phase c and the reference phase b minus the voltage Vcnt_b (Vc_b−Vcnt_b) would be zero since no back emf voltage exists in the floating phase c. However, the curves for Vc_b and Vcnt_b in FIG. 3B do not overlap. Consequently, the measurements of FIG. 3B (taken, for example, at discrete rotor positions at zero rotor speed) show that the floating phase voltage varies with rotor position, due to effects other than back emf.

Figure 3C:
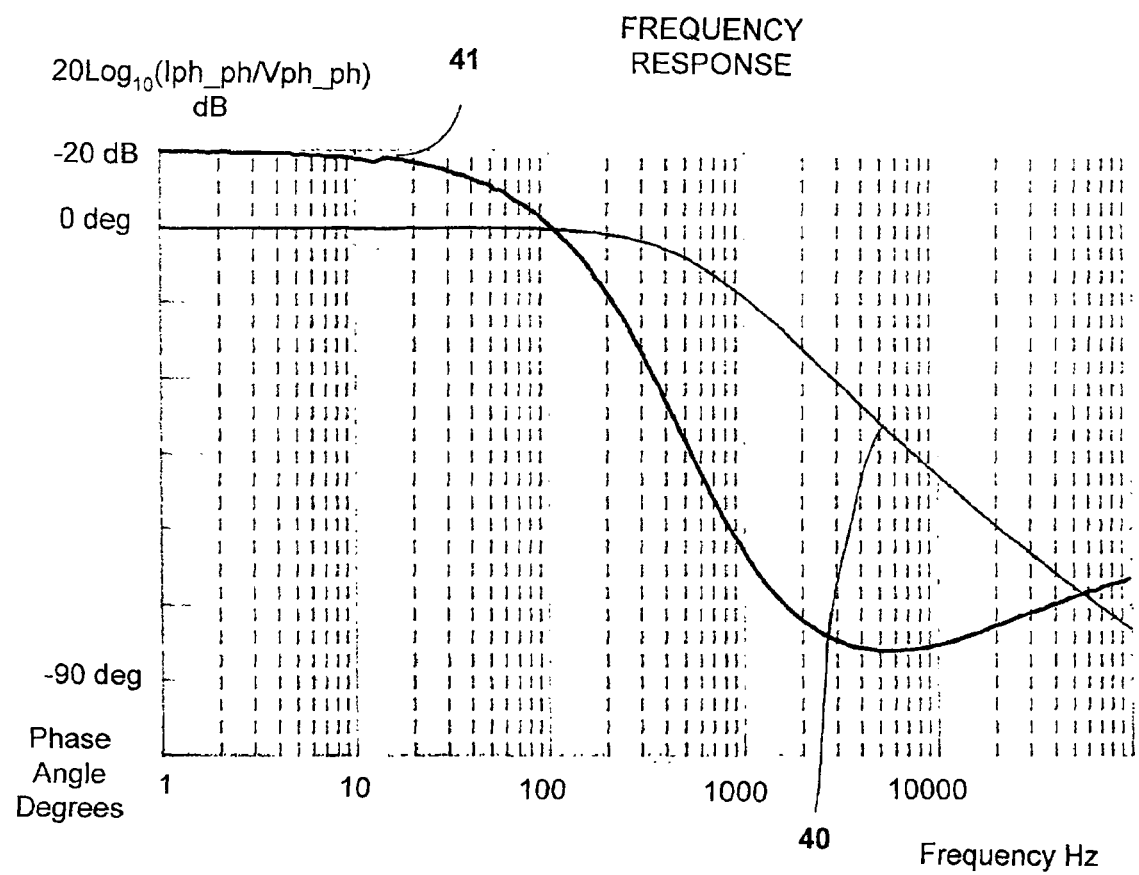
FIG. 3C is a Bode plot illustrating another motor performance variable measured according to the circuit of FIG. 3A.

In addition, the frequency response of an actual motor phase does not correlate with the conventional motor model 10. Referring to FIG. 3C, the inventors of the present invention measured the frequency response of a single phase (e.g., phase a, b, or c) of a motor by applying a phase to phase AC voltage Vph_ph (or phase to center tap voltage Vph_cnt) and measuring the resulting phase to phase current Iph_ph (or a phase to center tap current Iph_cnt) at various frequencies. The measurements were taken with floating phase a aligned with a rotor pole. The ratio 40 of the measured current (e.g., Ib_c) to the applied voltage (e.g., Vb_c) is plotted in FIG. 3C versus frequency, wherein the ratio is represented in dB ($20 \times \log_{10}$(Iph_ph/Vph_ph)) and the frequency axis is illustrated in a logarithmic scale. The phase relationship 41 between the applied voltage and the measured current is also plotted versus frequency.

The inventors of the present invention have thereby found that the Bode plot 40 of G(S)=Iph_ph/Vph_ph (or Iph_cnt/Vph_cnt) does not have a −20 dB per decade slope as would be expected from the model 10 of FIG. 2. Instead, the frequency response curve 40 has been found to have about a −17 dB per decade slope. In addition, the corner or 3 dB frequency of this frequency response curve has been found to be a function of the rotor position. Thus, the model 10 of FIG. 2 is inadequate to properly predict or simulate the actual behavior of polyphase motors in high accuracy control situations, such as high track density hard disk drive spindle motors.

Figure 3D:
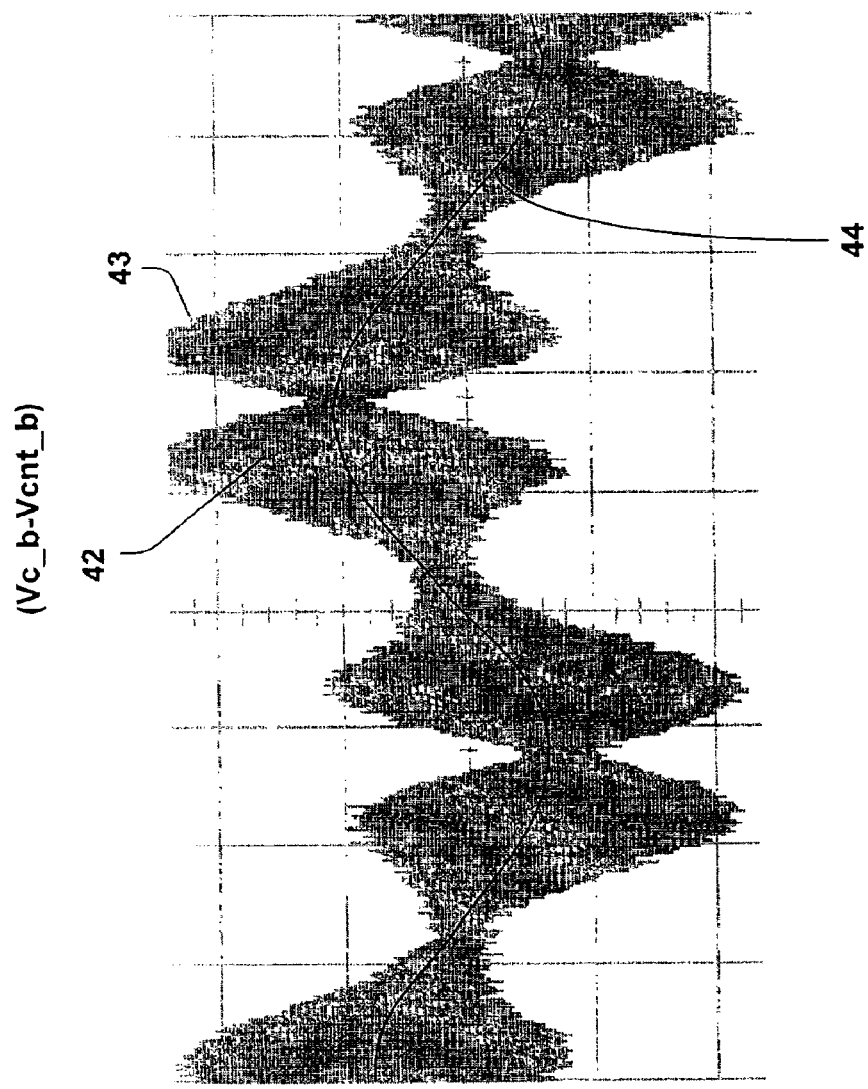
FIG. 3D is a graphical diagram illustrating another motor performance variable measured according to the circuit of FIG. 3A.

Referring also to FIG. 3D, a measurement of the voltage Vc_b−Vcnt_b is illustrated as a function of rotor position. The measurements illustrated in FIG. 3D were taken while the rotor was manually moved with phases a and b energized with a 5 kHz PWM signal and phase c floating. The waveform 42 was thus obtained, having a high frequency component in an envelope 43, riding along a low frequency sinusoidal curve 44. It will be noted that although the conventional model 10 suggests that the voltage Vc_b−Vcnt_b should be zero when there is no rotor movement, the measurements of FIG. 3D were taken while the rotor was moving. According to the conventional motor model 10, one would expect the voltage signal Vc_b−Vcnt_b to appear as a generally sinusoidal signal such as curve 44 (since the rotor is being manually rotated), corresponding solely to the back emf (e.g., Bemfc) associated with the floating phase. Once again, the conventional motor model 10 of FIG. 2 fails to simulate or predict this motor characteristic.

Figure 4A:
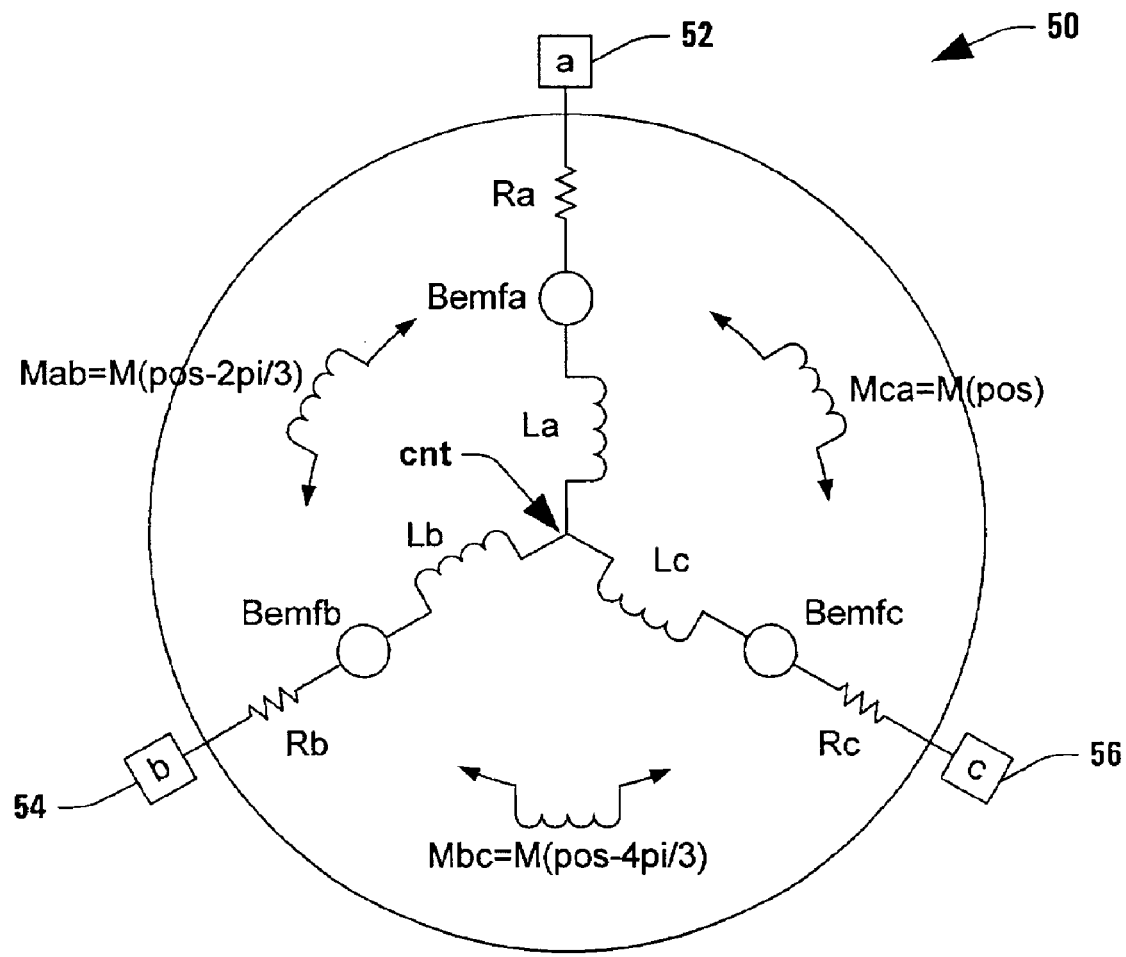
FIG. 4A is a schematic diagram illustrating an exemplary polyphase motor model in accordance with one aspect of the present invention.

Referring now to FIG. 4A, an exemplary model 50 of a polyphase electric motor in accordance with one aspect of the present invention is illustrated having phases a, b, and c extending between first ends joined at a center tap cnt and second ends extending outward from the center tap cnt to corresponding phase taps 52, 54, and 56. The model 50 further includes mutual inductance components Mab, Mca, and Mbc disposed between phases a and b, c and a, and b and c, respectively. In accordance with another aspect of the invention, one or more of the mutual inductance components Mab, Mca, and Mbc is a function of rotor position, having a 120 electrical degree phase relationship there between.

The phases a, b, and c have a phase resistance component (e.g., Ra, Rb, and Rc, respectively), a back emf component (e.g., Bemfa, Bemfb, and Bemfc, respectively), and a phase inductance component (e.g., La, Lb, and Lc, respectively), serially connected between the corresponding phase tap and the center tap. As described further hereinafter, one or more of the phase inductance components (e.g., La, Lb, and Lc) may also be a function of rotor position. Although the model 50 is illustrated as a three phase motor model, it will be recognized by those skilled in the art that other variations are possible within the scope of the invention, wherein polyphase motor models include a variety of phase configurations, for example, 6 phases.

The model 50 provides components which more accurately simulate and/or predict the actual motor performance characteristics illustrated in FIGS. 3B and 3D than in the prior art. In particular, the variation of the center tap voltage with respect to rotor position, and the deviation of the floating phase voltage from the back emf value as a function of the rotor position, are accounted for in the model 50, whereas the conventional model (e.g., model 10) did not explain this motor behavior. In many commutation circuits and schemes, a motor phase may be "floated" for a certain time period, during which the voltage across the floating phase is measured to sense the back emf (e.g., Bemfa). Many such schemes derive a rotor position measurement by sensing the zero crossing of the back emf signal. Hence, whereas prior control methods and commutation schemes relied on the assumption that the floating phase voltage was equal to the back emf associated therewith, the present invention, including model 50, provides more insight into the actual motor behavior, enabling advanced control schemes and apparatuses to be developed and verified.

Figure 4B:
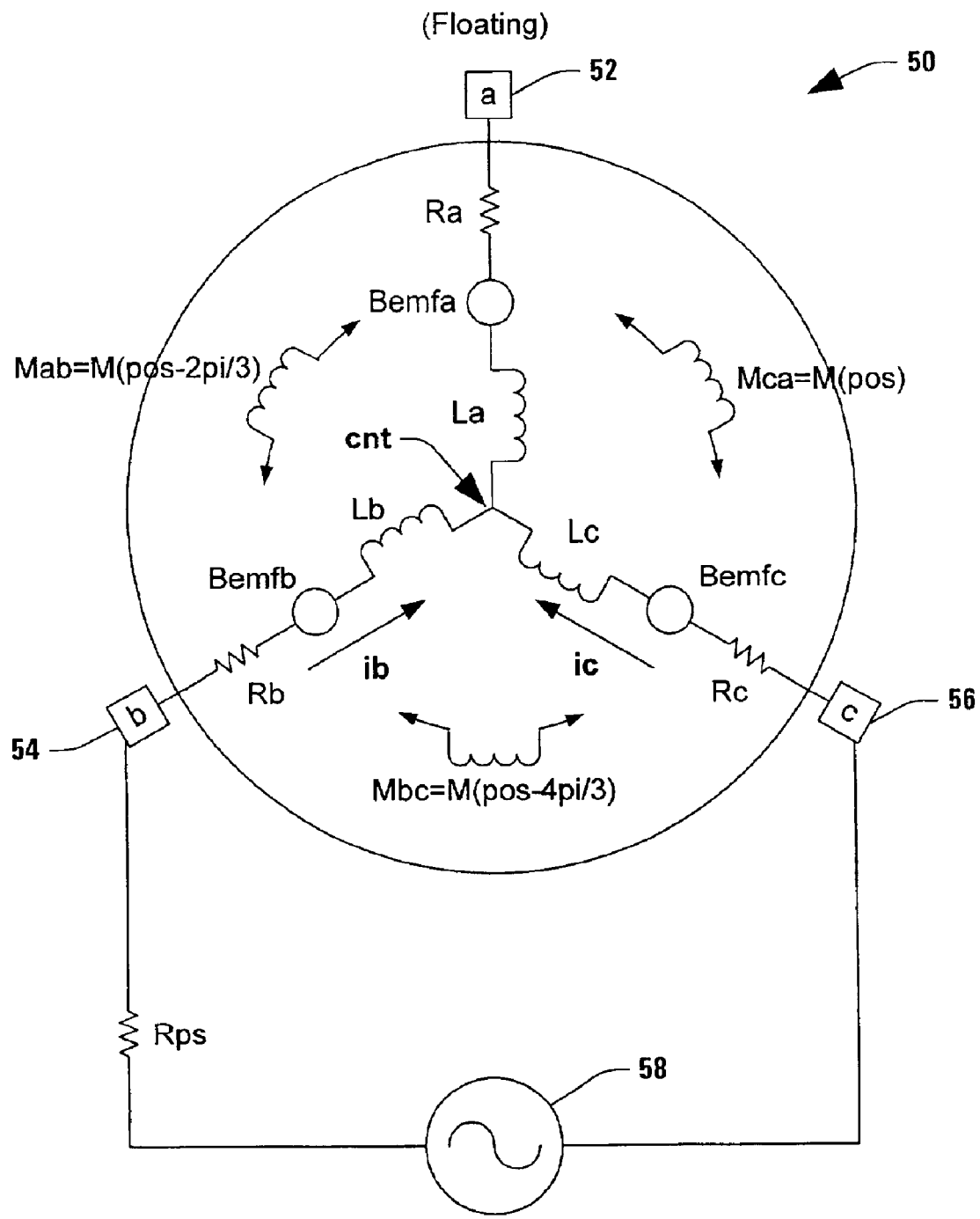
FIG. 4B is a schematic diagram illustrating a test circuit including the exemplary polyphase motor model of FIG. 4A.

Referring now to FIG. 4B, it has been found by the inventors of the present invention that the phase to phase mutual inductance components Mab, Mca, and Mbc vary with the rotor position due to variations in the reluctance in the path of the motor air gap flux between the rotor and stator based on the rotor magnet position. This is because, although the phase windings in the exemplary motor 2 of FIG. 1 are 120 electrical degrees apart, they are physically proximate one another in accordance with the stator winding pattern or configuration. Assuming zero rotor speed, the model 50 may be used to verify the measurements of FIG. 3B. As illustrated in FIG. 4B, an AC power source 58 is connected between phases b and c using phase taps 54 and 56, respectively, causing currents ib and ic to flow. The voltage across taps 54 and 56 is given by the following equation according to the model 50:

$$V_{bc} = V_{b\_cnt} - V_{c\_cnt},$$

where $V_{b\_cnt}$ is the voltage across phase b and $V_{c\_cnt}$ is the voltage across phase c. Considering the phase inductance components Lb and Lc as well as the mutual inductance component Mbc, the above equation may be rewritten as follows:

$$V_{bc} = (i_b R_b + L_b di_b/dt - M_{cb} di_c/dt) - (i_c R_c + L_c di_c/dt - M_{bc} di_b/dt).$$

Since $i_b = -i_c = i$, and assuming $R_b = R_c = R$, the equation may be simplified and rewritten as follows:

$$V_{bc} = i(2R) + (L_b + L_c + 2M_{bc}) di/dt,$$

where the term ($L_b + L_c + 2 M_{bc}$) is the motor phase to phase inductance.

In addition, since the rotor speed is assumed to be zero, the floating phase back emf (e.g., Bemfa) may be assumed to be zero as well. Due to the phase to phase mutual inductance components Mab and Mca, the floating phase voltage may be written as:

$$V_{a\_cnt} = -M_{ab} di_b/dt - M_{ca} di_c/dt$$
$$= -M_{ab} di/dt - M_{ca} d(-i)/dt$$
$$= (M_{ca} - M_{ab}) di/dt$$
$$= M_{a\_bc} di/dt$$

where $M_{a\_bc} = M_{ca} - M_{ab}$ is the equivalent mutual inductance of the two conducting phases b and c with respect to the floating phase a. Thus the floating phase voltage $V_{a\_cnt}$ is zero (assuming the rotor speed and hence the back emf Bemfa is zero, and that the di/dt is non-zero) when $M_{a\_bc}$ is zero, i.e. when $M_{ab} = M_{ca}$. However, this is true only when either the magnet pole of the permanent magnet rotor (e.g., rotor 6 of FIG. 1) is aligned with a de-energized or floating phase winding (e.g., phase a), or when the mid point between adjacent rotor magnet poles is aligned with such a phase winding.

Hence, while phase windings b and c are energized, the flux paths associated therewith will change as the rotor moves, resulting in a corresponding change in the reluctance of the air gap flux between the rotor and the stator. As the reluctance increases, the mutual inductance also increases. This is due to the saturating effect of the rotor magnet poles. When the magnet pole is proximate an energized winding where the winding current generates flux of the same polarity as the proximate magnet pole, the air gap flux tends to saturate, thereby reducing the magnetic effect of current flowing through the winding. When the pole moves away from the winding, the magnetic effect of the winding current is more pronounced. Thus, it will be appreciated to those skilled in the art that the mutual inductance components Mab, Mbc, and Mca of the motor model 50 vary with rotor position, due to the reluctance variation as the rotor position changes.

The model 50 therefore explains why the floating phase voltage measurements for actual motors is not equal to the back emf associated therewith, but instead is a function of rotor position due to the mutual inductance components Mab, Mbc, and Mca. The mutual inductance components of the model 50 account for the transformer effect of the changing reluctance in the motor air gap flux, caused by the relative position of the phase windings and the rotor magnet poles. Referring also to FIG. 3D, the mutual inductance components of the model 50 account for the transformer coupling of the PWM energy into the floating phase, which is superimposed on the lower frequency back emf waveform 44, whereby the composite signal 42 is measured at the motor terminals.

Figure 5A:
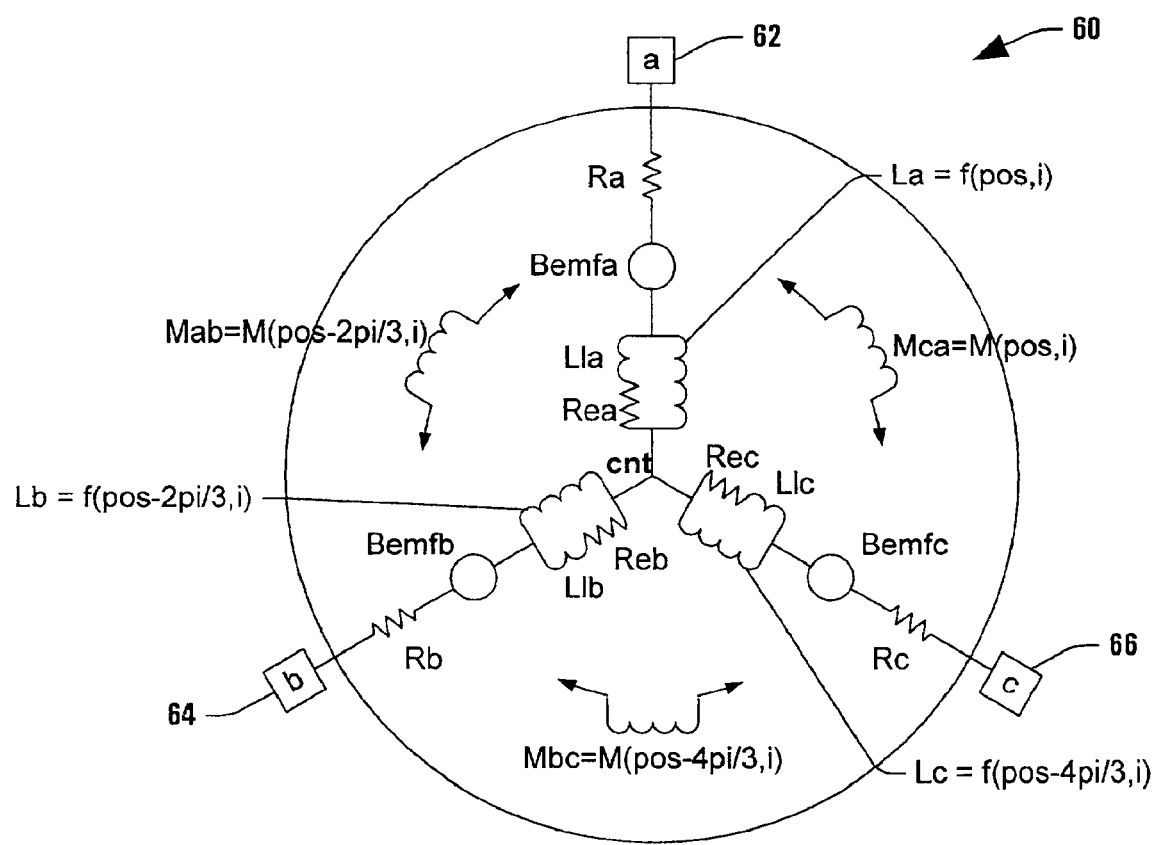
FIG. 5A is a schematic diagram illustrating another exemplary polyphase motor model in accordance with an aspect of the invention.

In addition to the mutual inductance components of the motor, the phase inductance components may also vary with rotor position. Referring now to FIG. 5A, another exemplary motor model 60 is illustrated having phases a, b, and c extending between first ends joined at a center tap cnt and second ends extending outward from the center tap cnt to corresponding phase taps 62, 64, and 66. The model 60 further includes mutual inductance components Mab, Mca, and Mbc disposed between phases a and b, c and a, and b and c, respectively. As described above, the mutual inductance components Mab, Mca, and Mbc may be a function of rotor position, having a 120 degree electrical phase relationship there between, as well as a function of current. The phases a, b, and c have a phase resistance component (e.g., Ra, Rb, and Rc, respectively), a back emf component (e.g., Bemfa, Bemfb, and Bemfc, respectively), and a phase inductance component.

The phase inductance component may further comprise a phase inductance element (e.g., La, Lb, and Lc, respectively) which may be a function of rotor position as well as current, in parallel with the series combination of a leakage inductance element (e.g., Lla, Llb, and Llc, respectively), and an eddy current resistance element (e.g., Rea, Reb, and Rec, respectively). Referring again to the Bode plot of FIG. 3C, it will be appreciated that the conventional motor models (e.g., model 10 of FIG. 2) anticipated a frequency response curve having a fixed 3 dB or corner frequency and a −20 dB per decade slope, since the prior models assumed a single phase inductance (e.g., La, Lb, and Lc of FIG. 2). However, the measured motor frequency response indicates a corner frequency varying with rotor position, and about a −17 dB per decade slope. The parallel combination of the phase inductance element (e.g., La of model 60) with the leakage inductance element (e.g., Lla), and eddy current resistance element (e.g., Rea) in the model 60 of the present invention accounts for these positional and phase variations, since the leakage inductance element is a function of rotor position. This provides significant advantages over the previous models in the design and verification of motor control devices and commutation schemes or methods.

In the model 60, it will be appreciated that there are three different kinds of phase inductance elements or components in the motor, and two kinds of mutual inductance components. Lx is the phase inductance of phase x when the other phases (e.g., y and z) are floating, Lx_cnt (e.g., Lx+Mxy) is the phase x inductance when phases x and y are conducting and phase z is floating, and Lxy (e.g., Lx_cnt+Ly_cnt, or Lx+Ly+2Mxy) is the inductance between phases x and y when phases x and y are conducting and phase z is floating. The component Mxy is the mutual inductance between phases x and y, and $M_{z\_xy}$ is the equivalent mutual inductance of phases x and y to phase z when current is conducting from phase x to phase y while phase z is floating. Further in this regard, it will be appreciated that the mutual inductance M alternates between positive and negative values depending on the rotor position, whereas the other inductance and mutual inductance components have positive values.

Figure 5B:
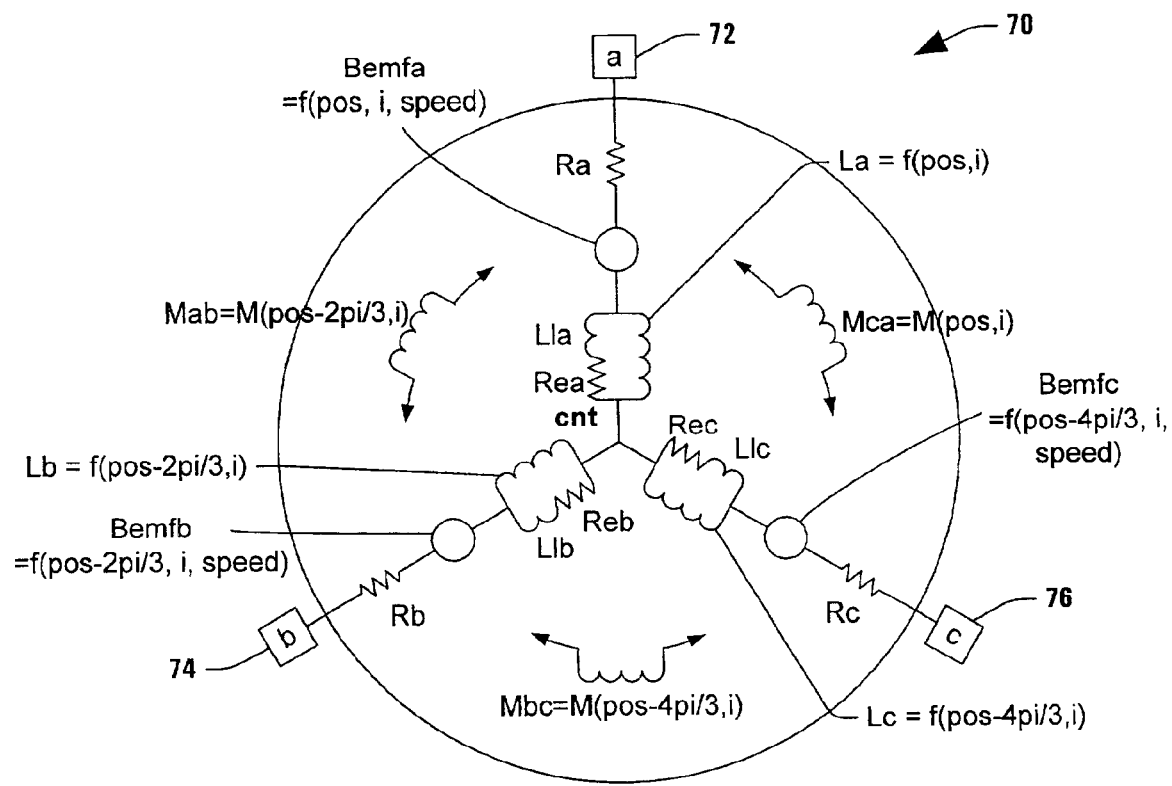
FIG. 5B is a schematic diagram illustrating another exemplary polyphase motor model in accordance with the invention.

In FIG. 5B, another exemplary motor model 70 is illustrated in which the back emf components Bemfa, Bemfb, and Bemfc are a function of rotor position, motor winding current, and speed. The inventors of the present invention have found that the back emf includes distortion at high current, high speed, and/or high current change rate (di/dt) operation due to this functionality, which renders the conventional motor model 10 inaccurate to predict motor behavior in such circumstances. The back emf is a voltage related to magnetic flux and the rotor speed. The inventors have found that this flux is related to both the permanent magnet poles of the rotor, as well as to the phase winding currents in the stator. As illustrated and described in greater herein above, the flux is further related to rotor position. Consequently, the back emf components Bemfa, Bemfb, and Bemfc are a function of rotor position, motor winding current, and rotor speed. Thus, the model 70 provides a more accurate representation of motor behavior than does the conventional model 10, for example, where back emf is measured in order to determine rotor position.

Figure 6A:
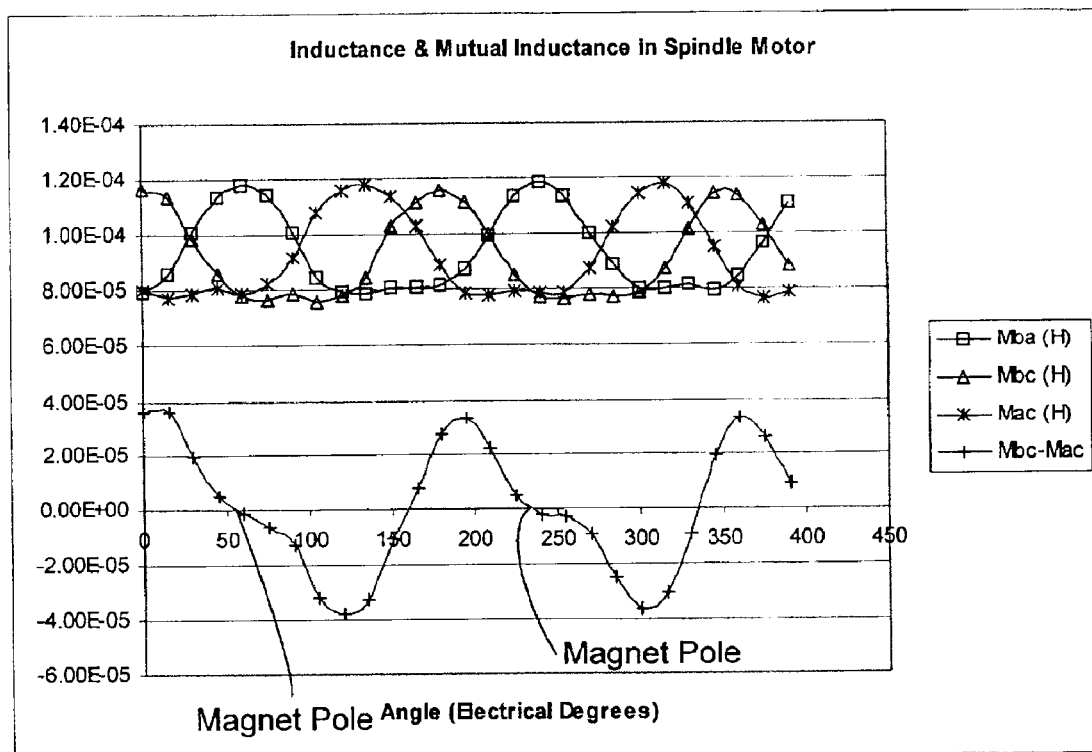
FIG. 6A is a graphical diagram illustrating several motor mutual inductance variables.
Figure 6B:
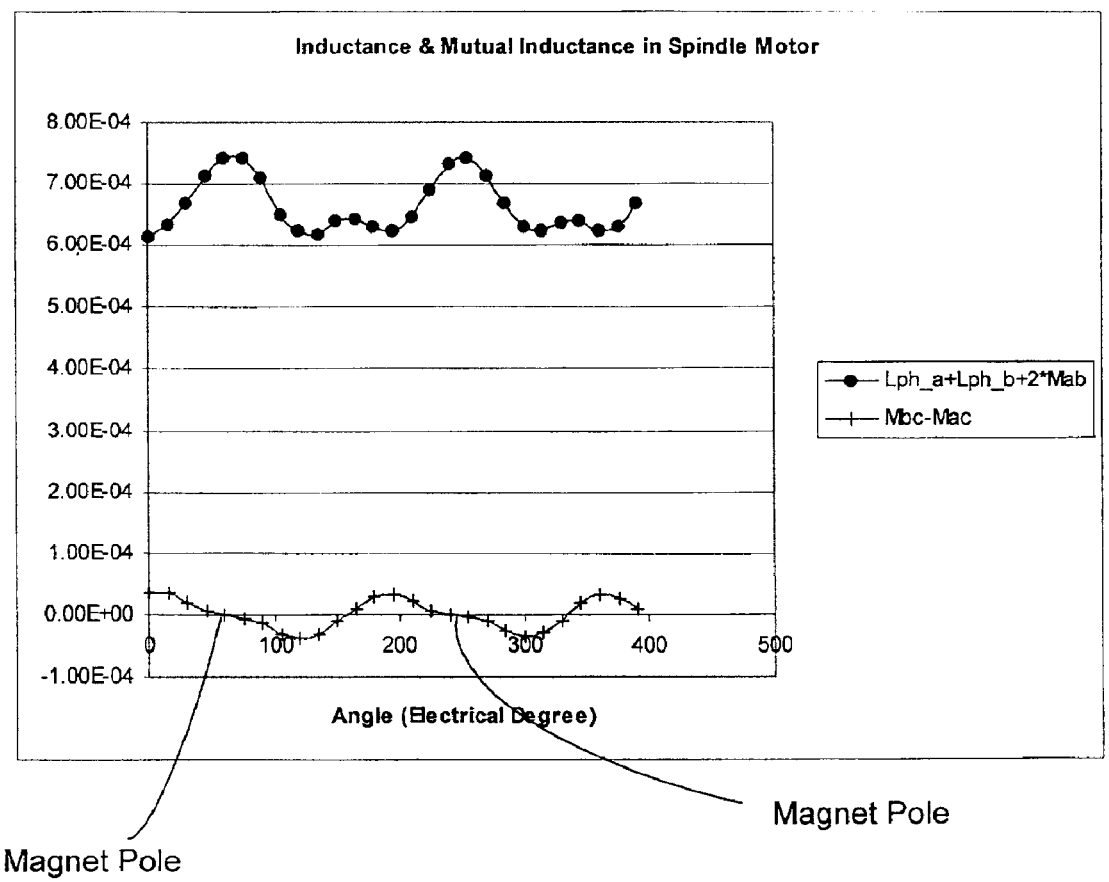
FIG. 6B is a graphical diagram illustrating another motor inductance variable.
Figure 6C:
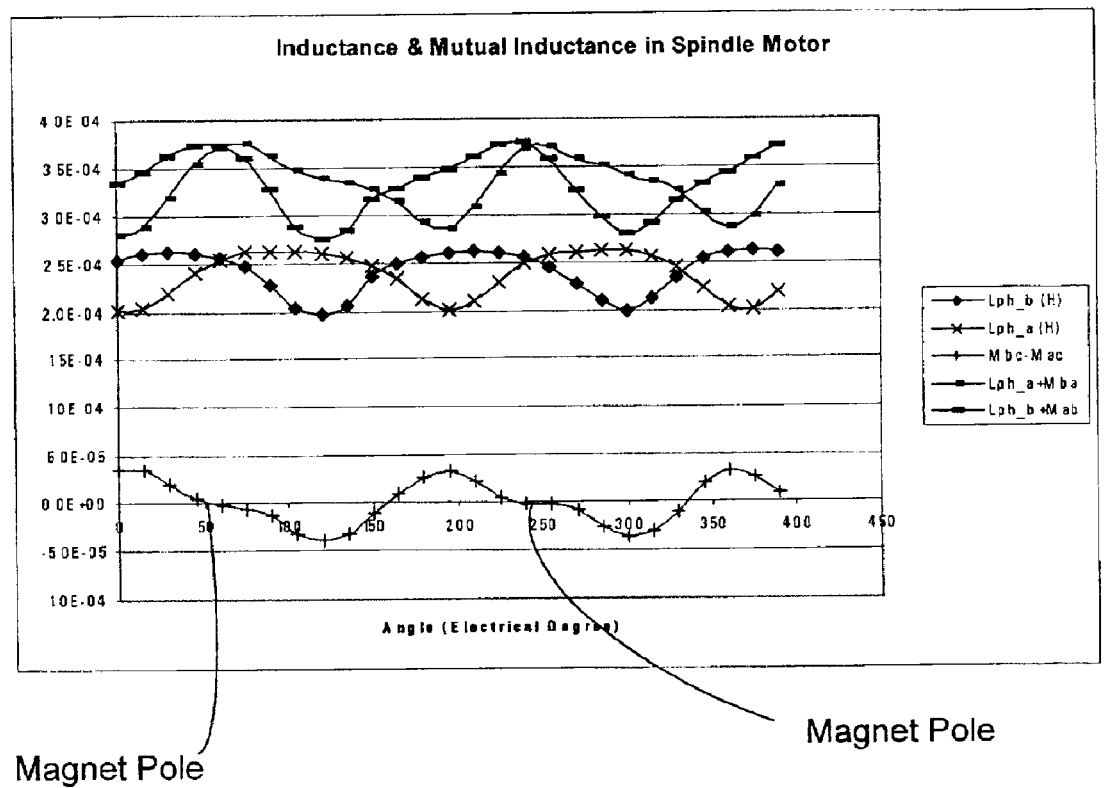
FIG. 6C is a graphical diagram illustrating several other motor inductance variables.

Referring also to FIGS. 6A–6C, nine motor inductance and mutual inductance variables are plotted as a function of rotor position in a mass storage device disk drive spindle motor. It is thus seen that the models 60 and 70 account for each of the several inductance components which vary as a function of rotor position. For example, in FIG. 6A, the positional variation in the equivalent mutual inductance Mbc–Mac accounts for the difference between Vc_b and Vcnt_b in FIG. 3B (no rotor motion), as well as the measured high frequency signal 42 superimposed on the back emf signal 44 of FIG. 3D (rotor moving). The comprehensive motor models 60 and 70 thus provide for improved simulation accuracy in testing refined control circuitry and motor commutation schemes associated with the accuracy required in high speed high track density disk drive applications and the like.

It will be noted in this regard that where a motor phase (e.g., phase c) is floated (e.g., during position measurement in a commutation scheme), the equivalent mutual inductance (e.g., Mbc–Mac) of the conducting phases (e.g., phases a and b) with respect to the floating phase (e.g., phase c) will pass through zero at four points in one electrical angular revolution of the rotor. In particular, the mutual inductance Mbc–Mac passes through zero where a rotor magnet pole is aligned with the floating phase, as well as where the floating phase is aligned with a pole boundary between adjacent magnet poles.

The models 50, 60, and/or 70 may be advantageously employed in simulating the performance of a polyphase electric motor. The models, moreover, may be constructed in hardware and/or software, whereby efficient simulation of motor behavior may be accomplished in order to design and test various motor control circuitry and commutation schemes. In this regard, the model may take the form of a load circuit used to test a motor control circuit input signals (e.g., currents and/or voltages) may be applied to the phase taps (e.g., taps 52, 54, 56; 62, 64, 66; and/or 72, 74, 76) and the model may then be used to simulate the performance of a polyphase motor. The motor performance may then be observed via numerical output or physical measurement of various performance characteristics (e.g., torques, speed, rotor position, voltages, and/or currents). The input signals may be commutation signals in accordance with a commutation scheme, and one or more motor performance parameters may be measured and correlated in order to obtain further operational parameters associated with the motor.

Figure 7:
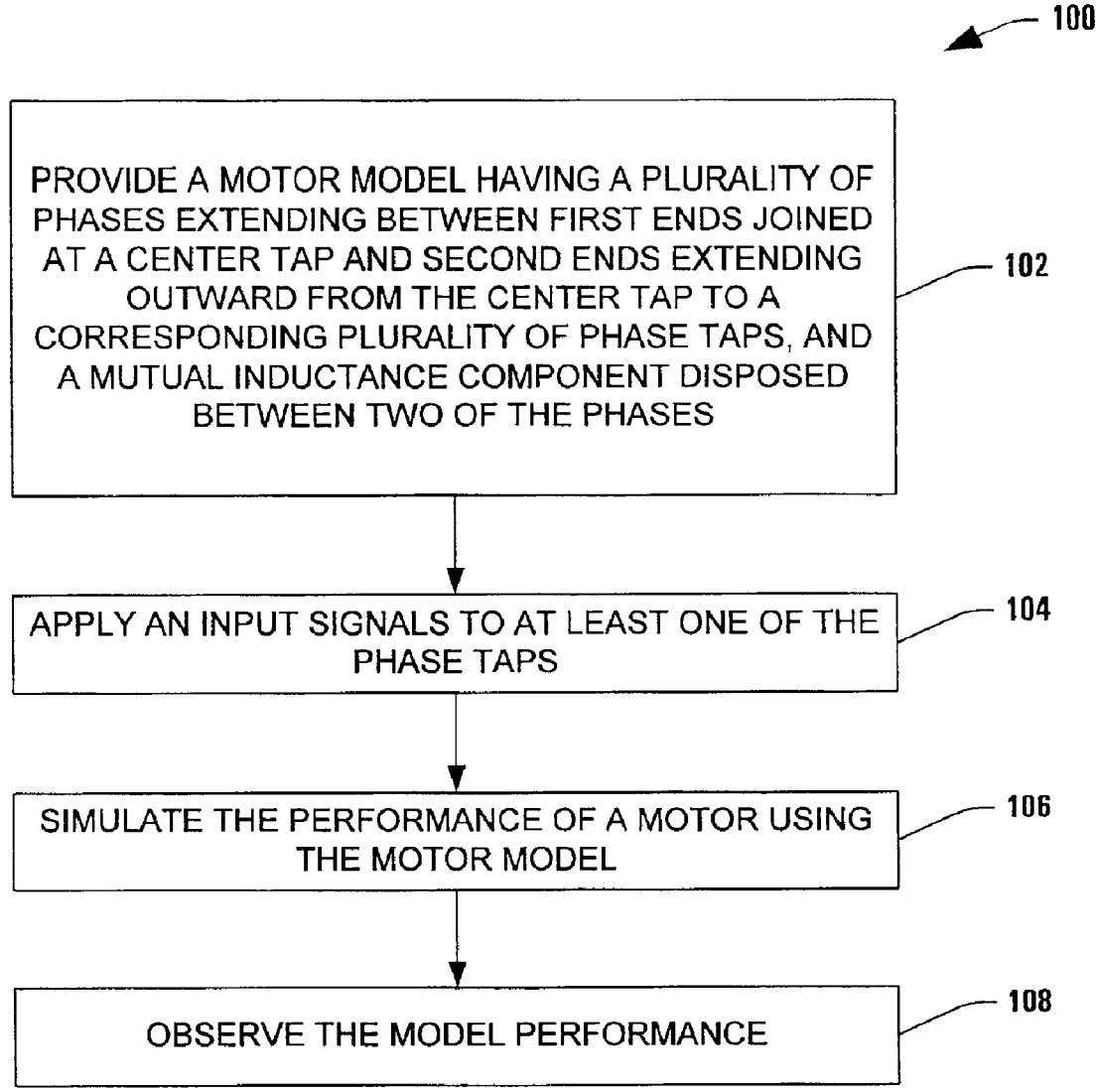
FIG. 7 is a flow diagram illustrating a method for simulating the performance of a polyphase motor in accordance with another aspect of the invention.

Referring now to FIG. 7, an exemplary method 100 for simulating the performance of a polyphase electric motor is illustrated. Beginning at step 102, a motor model is provided having plurality of phases extending between first ends joined at a center tap and second ends extending outward from the center tap to a corresponding plurality of phase taps, and a mutual inductance component disposed between two of the phases. Thereafter at step 104, an input signal is applied to at least one of the phase taps, and the motor performance is then simulated at step 106 using the model and the input signal. The model performance may then be observed at step 108.

The method 100 may be employed, for example, in simulating a three phase disk drive spindle motor. Accordingly, the motor model provided at step 102 may comprise first, second, and third phases extending between first ends joined at the center tap and second ends extending outward from the center tap to first, second, and third phase taps, respectively, as well as first, second, and third mutual inductance components disposed between the first and second, the second and third, and the third and first phases, respectively. In this case, applying an input signal at step 104 to at least one of the phase taps may comprise applying first, second, and third input signals to the first, second, and third phase taps, respectively.

It will be appreciated that the particular functional relationships between one or more of the inductance components or elements in the exemplary models 50, 60, and/or 70 and the rotor position may be derived through measurement of a particular motor, in similar fashion to the motor measurements illustrated and described herein. Such measurement methodology or experimental testing may further be combined with numerical analysis whereby, for example, curve fitting algorithms and the like may be employed to derive a mathematical functional relationship. In addition, such functional relationships may be derived mathematically according to the physics of a particular motor design, taking into consideration one or more architectural characteristics of a given design. For example, a mutual inductance parameter may be related to rotor position according to a particular stator winding pattern employed, the proximity of adjacent stator winding coils, the dimensions of the motor air gap, and the like. In this way, the invention enables motor modeling and simulation far superior to that heretofore available.

Although the invention has been shown and described with respect to a certain preferred applications or implementations, equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several implementations, such feature may be combined with one or more other features of the other implementations as may be desired and advantageous for any given or particular application.

What is claimed is:

1. A model for simulating the performance of a polyphase electric motor having a rotor, comprising:
   a plurality of phases extending between first ends joined at a center tap and second ends extending outward from the center tap to a corresponding plurality of phase taps; and
   a mutual inductance component disposed between two of the phases.

2. The model of claim 1, wherein the mutual inductance component is a function of rotor position.

3. The model of claim 2, wherein the mutual inductance component is a function of current.

4. The model of claim 2, wherein at least one phase comprises a phase resistance component, a back emf component, and a phase inductance component, and wherein the phase inductance component is a function of rotor position.

5. The model of claim 2, wherein the phase inductance component is a function of current.

6. The model of claim 1, wherein at least one phase comprises a phase resistance component, a back emf component, and a phase inductance component, and wherein the phase inductance component is a function of rotor position.

7. The model of claim 1, wherein at least one phase comprises a phase resistance component, a back emf component, and a phase inductance component, and wherein the back emf component is a voltage which is a function of rotor speed, motor current, and rotor position.

8. A model for simulating the performance of a three phase electric motor having a rotor, comprising:
   first, second, and third phases extending between first ends joined at a center tap and second ends extending outward from the center tap to first, second, and third phase taps, respectively; and first, second, and third mutual inductance components disposed between the first and second, the second and third, and the third and first phases, respectively.

9. The model of claim 8, wherein the first phase includes a first phase resistance component, a first back emf component, and a first phase inductance component connected in series between the center tap and the first phase tap; wherein the second phase includes a second phase resistance component, a second back emf component, and a second phase inductance component connected in series between the center tap and the second phase tap; and wherein the third phase includes a third phase resistance component, a third back emf component, and a third phase inductance component connected in series between the center tap and the third phase tap.

10. The model of claim 9, wherein the first, second, and third mutual inductance components are a function of rotor position.

11. The model of claim 10, wherein the first phase inductance component includes a first phase inductance element connected in parallel with a first leakage inductance element and a first eddy current resistance element; wherein the second phase inductance component includes a second phase inductance element connected in parallel with a second leakage inductance element and a second eddy current resistance element; and wherein the third phase inductance component includes a third phase inductance element connected in parallel with a third leakage inductance element and a third eddy current resistance element.

12. The model of claim 11, wherein the first, second, and third phase inductance elements are a function of rotor position.

13. The model of claim 9, wherein the first phase inductance component includes a first phase inductance element connected in parallel with a first leakage inductance element and a first eddy current resistance element; wherein the second phase inductance component includes a second phase inductance element connected in parallel with a second leakage inductance element and a second eddy current resistance element; wherein the third phase inductance component includes a third phase inductance element connected in parallel with a third leakage inductance element and a third eddy current resistance element; and wherein the first, second, and third phase inductance elements are a function of rotor position.

14. The model of claim 9, wherein the first, second, and third back emf components are a voltage which is a function of a magnetic flux and rotor speed.

15. The model of claim 14, wherein the magnetic flux is a function of motor current and rotor position, whereby the first, second, and third back emf components are a function of rotor speed, rotor position, and motor current.

16. The model of claim 8, wherein the first, second, and third mutual inductance components are a function of rotor position.

17. A method of simulating the performance of a polyphase electric motor having a rotor, comprising:
providing a motor model having plurality of phases extending between first ends joined at a center tap and second ends extending outward from the center tap to a corresponding plurality of phase taps, and a mutual inductance component disposed between two of the phases;
applying an input signal to at least one of the phase taps;
simulating the performance of a motor using the model and the input signal; and
observing the performance of the model.

18. The method of claim 17, wherein the motor model comprises first, second, and third phases extending between first ends joined at the center tap and second ends extending outward from the center tap to first, second, and third phase taps, respectively, and first, second, and third mutual inductance components disposed between the first and second, the second and third, and the third and first phases, respectively; and wherein applying an input signal to at least one of the phase taps comprises applying first, second, and third input signals to the first, second, and third phase taps, respectively.

19. The method of claim 18, wherein the first, second, and third mutual inductance components are a function of rotor position.

20. The method of claim 19, wherein applying the first, second, and third inputs signals to the first, second, and third phase taps comprises providing commutation signals to the first, second, and third phase taps according to a commutation scheme, and wherein observing the performance of the model further comprises determining the rotor position as a function of time.

21. The method of claim 18, wherein the first phase includes a first phase resistance component, a first back emf component, and a first phase inductance component connected in series between the center tap and the first phase tap; wherein the second phase includes a second phase resistance component, a second back emf component, and a second phase inductance component connected in series between the center tap and the second phase tap; and wherein the third phase includes a third phase resistance component, a third back emf component, and a third phase inductance component connected in series between the center tap and the third phase tap.

22. The method of claim 21, wherein the first phase inductance component includes a first phase inductance element connected in parallel with a first leakage inductance element and a first eddy current resistance element; wherein the second phase inductance component includes a second phase inductance element connected in parallel with a second leakage inductance element and a second eddy current resistance element; wherein the third phase inductance component includes a third phase inductance element connected in parallel with a third leakage inductance element and a third eddy current resistance element; and wherein the first, second, and third phase inductance elements are a function of rotor position.

23. A load circuit for simulating the performance of a three phase electric motor having a rotor, comprising:
first, second, and third phases extending between first ends joined at a center tap and second ends extending outward from the center tap to first, second, and third phase taps, respectively; and
first, second, and third mutual inductance components disposed between the first and second, the second and third, and the third and first phases, respectively.

24. The circuit of claim 23, wherein the first, second, and third mutual inductance components are a function of rotor position.

25. The circuit of claim 24, wherein the first phase includes a first phase resistance component, a first back emf component, and a first phase inductance component connected in series between the center tap and the first phase tap; wherein the second phase includes a second phase resistance component, a second back emf component, and a second phase inductance component connected in series between the center tap and the second phase tap; and wherein the third phase includes a third phase resistance component, a third back emf component, and a third phase inductance component connected in series between the center tap and the third phase tap.

26. The circuit of claim 25, wherein the first phase inductance component includes a first phase inductance element connected in parallel with a first leakage inductance element and a first eddy current resistance element; wherein the second phase inductance component includes a second phase inductance element connected in parallel with a second leakage inductance element and a second eddy current resistance element; wherein the third phase inductance component includes a third phase inductance element connected in parallel with a third leakage inductance element and a third eddy current resistance element; and wherein the first, second, and third phase inductance elements are a function of rotor position.

27. A method of testing a commutation scheme for controlling the position of an electric motor having a rotor, comprising:

providing a model of the motor having first, second, and third phases extending between first ends joined at a center tap and second ends extending outward from the center tap to first, second, and third phase taps, respectively, and first, second, and third mutual inductance components disposed between the first and second, the second and third, and the third and first phases, respectively;

selectively applying first, second, and third input signals to the first, second, and third phase taps, respectively according to the commutation scheme;

simulating the performance of a motor using the model and the input signals; and observing the performance of the model.

28. The method of claim 27, wherein the first, second, and third mutual inductance components are a function of rotor position.

29. The method of claim 27, wherein observing the performance of the model further comprises determining the rotor position as a function of time, further comprising selectively applying the first, second, and third input signals according to the rotor position.

30. The method of claim 27, wherein the first phase includes a first phase resistance component, a first back emf component, and a first phase inductance component connected in series between the center tap and the first phase tap; wherein the second phase includes a second phase resistance component, a second back emf component, and a second phase inductance component connected in series between the center tap and the second phase tap; and wherein the third phase includes a third phase resistance component, a third back emf component, and a third phase inductance component connected in series between the center tap and the third phase tap.

31. The method of claim 30, wherein the first phase inductance component includes a first phase inductance element connected in parallel with a first leakage inductance element and a first eddy current resistance element; wherein the second phase inductance component includes a second phase inductance element connected in parallel with a second leakage inductance element and a second eddy current resistance element; wherein the third phase inductance component includes a third phase inductance element connected in parallel with a third leakage inductance element and a third eddy current resistance element; and wherein the first, second, and third phase inductance elements are a function of rotor position.

* * * * *